(12) United States Patent
Okada

(10) Patent No.: US 7,112,636 B2
(45) Date of Patent: Sep. 26, 2006

(54) EPOXY RESIN COMPOSITION

(75) Inventor: Yuji Okada, Anan (JP)

(73) Assignee: Nichia Corporation, Tokushima (JP)

( * ) Notice: Subject to any disclaimer, the term of this patent is extended or adjusted under 35 U.S.C. 154(b) by 257 days.

(21) Appl. No.: 10/725,440

(22) Filed: Dec. 3, 2003

(65) Prior Publication Data

US 2004/0122208 A1    Jun. 24, 2004

(30) Foreign Application Priority Data

Dec. 6, 2002  (JP)  ............................. 2002-355283

(51) Int. Cl.
*C08L 63/00*  (2006.01)
*C09K 11/02*  (2006.01)

(52) U.S. Cl. .................. 525/533; 252/183.11

(58) Field of Classification Search ..................... None
See application file for complete search history.

(56) References Cited

U.S. PATENT DOCUMENTS 3,637,572 A  *  1/1972  Ogata et al. ................ 523/220

FOREIGN PATENT DOCUMENTS

| JP | 04-209624 | 7/1992 |
| JP | 08-034834 A | * 2/1996 |
| JP | 11-005829 | 1/1999 |
| JP | 2002-053644 | 2/2002 |

OTHER PUBLICATIONS

CAPLUS accession No. 1971:43048 for U.S Patent No. 3,637,572 containing registry No. 31586-93-3, 1971.*

* cited by examiner

*Primary Examiner*—Robert Sellers
(74) *Attorney, Agent, or Firm*—Wenderoth, Lind & Ponack, L.L.P.

(57) ABSTRACT

An epoxy resin composition comprising an epoxy resin, a hardening agent and a hardening accelerator as an indispensable ingredients is provided wherein the hardened resin has a high translucency and has little discoloration under high temperature and high humidity and is excellent at heat resistance and light fastness by compounding a phosphonium compound represented by the following formula (I) as a hardening accelerator.

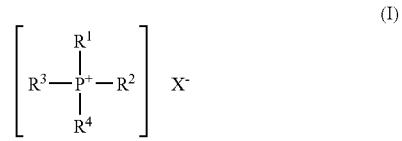

5 Claims, 3 Drawing Sheets

EPOXY RESIN COMPOSITION

BACKGROUND OF THE INVENTION

1. Field of the Invention

The present invention relates to an epoxy resin composition and a hardened resin thereof, in more detail an epoxy resin composition using a heat latency polymerization catalyst and its hardened resin.

2. Background Art

Semiconductor light emitting devices, such as light emitting diode, LD (lazer diode) and the like, are small and emit light of vivid color efficiently. Moreover, since it is a semiconductor device, it does not burn out like a bulb. In addition, it has the feature of being excellent at driving characteristics and resistant to vibration and repetition of ON/OFF lighting. Therefore, it is used as various indicators or various light sources. As a material which shields such a semiconductor light emitting device, an epoxy resin is preferred to use from the point of a translucency, productivity, the ease of treating, etc. The epoxy resin hardened especially using an acid anhydride hardening agent has little discoloration by heat treatment, and is excellent at a translucency and light fastness. A hardening accelerator for promoting hardening is also used together in the epoxy resin composition using such an acid anhydride hardening agent.

As a hardening accelerator, a high heat-resistant phosphonium salt of halogen is used conventionally. However, such a halogen salt is not desirable because it becomes the cause of electrode corrosion especially under high temperature and high humidity. For solving this problem, tetraphenylphosphonium tetraphenylborate is developed as a hardening accelerator (for example, refer to JP-A 4-209624). However, tetraphenylphosphonium tetraphenylborate has bad mutual solubility with an acid anhydride hardening agent and an epoxy resin, and has the problem of becoming a cloudy hardened resin without a translucency when the epoxy resin composition compounded this tetraphenylphosphonium tetraphenylborate is hardened comparatively at low temperature.

Although in recent years, tetrabutylphosphonium tetraphenylborate is developed as a hardening accelerator in which the solubility has been improved (for example, refer to JP-A 2002-53644), heat resistance thereof is inferior to the conventional tetraphenylphosphonium tetraphenylborate, and therefore the development of catalyst having higher solubility and being excellent at heat resistance is desired.

SUMMARY OF THE INVENTION

The object of this invention is to provide an epoxy resin composition whose hardened resin has a high translucency and has little discoloration under high temperature and high humidity, and is excellent at heat resistance and light fastness.

That is, the present invention provides:

(1) An epoxy resin composition comprising an epoxy resin, a hardening agent and a hardening accelerator as indispensable ingredients, wherein said hardening accelerator is a phosphonium compound represented by the following formula (I):

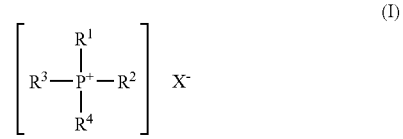

wherein $R^1$ to $R^4$ are the same or different, and are an optionally substituted alkyl group, an optionally substituted aryl group, an optionally substituted aralkyl group, an optionally substituted diarylmethyl group or a group represented by the following formula (II):

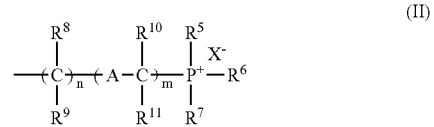

wherein $R^5$ to $R^7$ are the same or different, and are an optionally substituted alkyl group, an optionally substituted aryl group, an optionally substituted aralkyl group or an optionally substituted diarylmethyl group, $R^8$ to $R^{11}$ are the same or different, and are a hydrogen atom, an optionally substituted alkyl group or an optionally substituted aryl group, A is an optionally substituted aromatic hydrocarbon ring, n is an integer of 1 to 5, m is 0 or 1, and X represents a halogen atom, and $SbF_6$, $AsF_6$, $PF_6$, $BF_4$ or $BPh_4$;

provided that at least one of $R^1$ to $R^4$ is a group represented by the formula (II), or any one of $R^1$ to $R^4$ and any one of $R^5$–$R^7$ may be combined together to form a lower alkylene group which forms a heterocyclic ring containing two phosphorus atoms, and X is as defined in the formula (II);

(2) The epoxy resin composition according to the above-mentioned (1) wherein the phosphonium compound is one or more kinds of phosphonium compound selected from the group consisting of (a) a phosphonium compound wherein, in the above formula (I), at least one of $R^1$ to $R^4$ is a group represented by the formula (II), $R^5$ to $R^7$ are the same or different, and are a phenyl group, an optionally substituted benzyl group, a naphthylmethyl group, an optionally substituted diphenylmethyl group or an optionally substituted alkyl group, $R^8$ is a hydrogen atom, $R^9$ is a hydrogen atom or a phenyl group, n is an integer of 1 to 4, m is 0, and the rest of $R^1$ to $R^4$ is a phenyl group, an optionally substituted benzyl group, a naphthylmethyl group, an optionally substituted diphenylmethyl group or an optionally substituted alkyl group, (b) a phosphonium compound wherein, in the above formula (I), $R^2$ is a group represented by the formula (II), $R^6$, $R^7$ and $R^9$ are a phenyl group, $R^8$ is a hydrogen atom, m is 0, n is 2, $R^1$ and $R^5$ are combined together to form a $C_{1-4}$ alkylene group, and $R^3$ and $R^4$ are a phenyl group, (c) a phosphonium compound wherein, in the above formula (I), $R^1$ is a group represented by the formula (II), $R^5$ to $R^7$ are a phenyl group or a group represented by the formula: —$(CH_2)_p$—$PPh_2$ (wherein, p is an integer of 1 to 4), $R^8$ to $R^{11}$ are a hydrogen atom, A is an optionally substituted benzene ring, m and n are 1, and $R^2$ to $R^4$ are a phenyl group or a group represented by the formula: —(CH$_2$)$_p$—PPh$_2$ (wherein, p is an integer of 1 to 4), (d) a phosphonium compound wherein, in the above formula (I), R$^2$ is a group represented by the formula (II), R$^6$ and R$^7$ are a phenyl group, R$^8$ to R$^{11}$ are a hydrogen atom, A is an optionally substituted benzene ring, m and n are 1, R$^1$ and R$^5$ are combined together to form a C$_{1-8}$ alkylene group, and R$^3$ and R$^4$ are a phenyl group;

(3) The epoxy resin composition according to the above-mentioned (1), wherein the amount of a phosphonium compound to be added is 0.05 to 5 parts by weight (phr) relative to 100 parts by weight (phr) of epoxy resin;

(4) The epoxy resin composition according to the above-mentioned (1), wherein the epoxy resin comprises a triazine derivative epoxy resin; and (5) A hardened resin which is obtained by heating and curing the epoxy resin composition according to the above-mentioned (1).

According to the present invention, by using phosphonium compound represented by the above-mentioned formula (I) as a hardening accelerator, an epoxy resin composition comprising an epoxy resin, a hardening agent and a hardening accelerator as an indispensable ingredients can be provided wherein the hardened resin has a high translucency and has little discoloration under high temperature and high humidity and is excellent at heat resistance and light fastness.

DETAILED DESCRIPTION OF THE PREFERRED EMBODIMENTS

Figure 1:
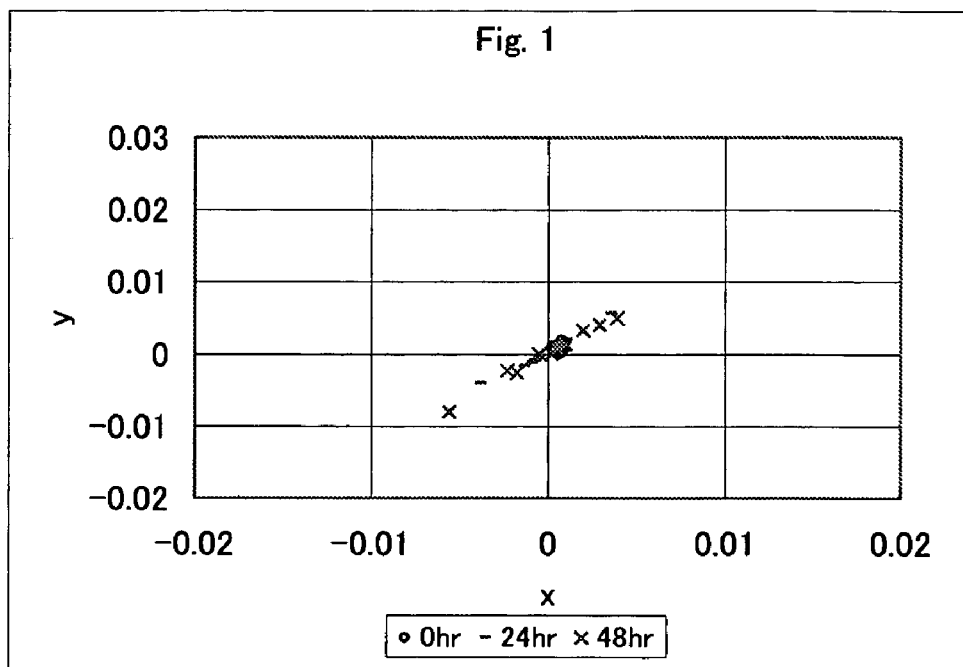
FIG. 1 is a chromaticity diagram showing the change of emission color of the epoxy resin hardened resin (LED) obtained in Example 1.

The epoxy resin composition of the present invention contains an epoxy resin, a hardening agent and a hardening accelerator as an indispensable component, and it is characterized in that the hardening accelerator is a phosphonium compound represented by the following formula (I). By using a hardening accelerator having such fixed chemical structure, an epoxy resin composition can be provided whose hardened resin has a high translucency and has little discoloration under high temperature and high humidity, and is excellent at heat resistance and light fastness.

The phosphonium compound of the hardening accelerator used in the present invention is represented by the following formula (I).

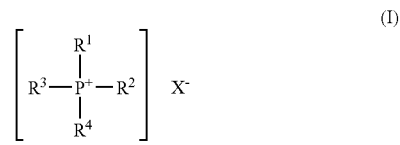

wherein, at least one of R$^1$ to R$^4$ is a group represented by the formula (II).

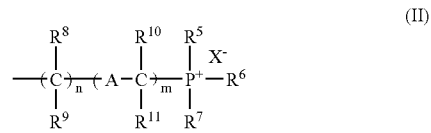

In the formula (II), R$^5$ to R$^7$ are the same or different, and are an optionally substituted alkyl group, an optionally substituted aryl group, an optionally substituted aralkyl group or an optionally substituted diarylmethyl group, R$^8$ to R$^{11}$ are the same or different, and are a hydrogen atom, an optionally substituted alkyl group or an optionally substituted aryl group, A is an optionally substituted aromatic hydrocarbon ring, n is an integer of 1 to 5, m is 0 or 1, and X represents a halogen atom, and SbF$_6$, AsF$_6$, PF$_6$, BF$_4$ or BPh$_4$.

Among R$^1$ to R$^4$ in the formula (I), the group(s) other than the group represented by the formula (II) is(are) the same or different, and is(are) an optionally substituted alkyl group, an optionally substituted aryl group, an optionally substituted aralkyl group, an optionally substituted diarylmethyl group. Or any one of R$^1$ to R$^4$ and any one of R$^5$ to R$^7$ may be combined together to form a lower alkylene group which forms a heterocyclic ring containing two phosphorus atoms.

In addition, X in the formula (I) is as defined in the formula (II).

As the substituted alkyl group in the optionally substituted alkyl group for R$^1$ to R$^4$, a group represented by the formula: —(CH$_2$)$_p$—PPh$_2$ (wherein, p is an integer of 1 to 4) can be exemplified.

Examples of the aryl group of the optionally substituted aryl group for R$^1$ to R$^4$ include phenyl group, naphthyl group and the like, and the substituents thereof include, for example, a halogen atom such as fluorine, chlorine, etc., cyano group, benzoyl group, alkyl group, etc.

Examples of the optionally substituted aralkyl group for R$^1$ to R$^4$ include benzyl group, phenethyl group, naphthylmethyl group, pyrenylmethyl group, anthranenylmethyl group and the like, and the substituent thereof includes, for example, a halogen atom such as fluorine, chlorine, bromine, etc., cyano group, benzoyl group, alkyl group, a halogenated alkyl group such as trifluoromethyl, an optionally substituted phenyl group (said substituent includes, for example, a halogen atom such as fluorine, chlorine etc., a halogenated alkyl group such as trifluoromethyl, etc.) and the like. The number of the substituent is preferably 1 or 2.

Examples of the optionally substituted diarylmethyl group for R$^1$ to R$^4$ include diphenylmethyl group, etc., and the substituent includes a halogen atom such as fluorine, chlorine, and the like.

In addition, in the formula (II), the optionally substituted alkyl group, optionally substituted aryl group, optionally substituted aralkyl group and optionally substituted diarylmethyl group for $R^5$ to $R^7$ are as defined for the optionally substituted alkyl group, optionally substituted aryl group, optionally substituted aralkyl group and optionally substituted diarylmethyl group in the above-mentioned $R^1$ to $R^4$, respectively.

Furthermore, when any one of $R^1$ to $R^4$ and any one of $R^5$–$R^7$ are combined together to form a lower alkylene group which forms a heterocyclic ring containing two phosphorus atoms, said lower alkylene group is preferably a $C_{1-4}$ alkylene group such as methylene, ethylene, propylene isopropylene, butylene, isobutylene, and the like.

Among the phosphonium compound represented by the formula (I), specifically, the compound represented by the following (a) to (d) is preferred as hardening accelerator.

(a) A phosphonium compound wherein, in the above-mentioned formula (I), at least one of $R^1$ to $R^4$ is a group represented by the above-mentioned formula (II), $R^5$ to $R^7$ are the same or different, and are a phenyl group, an optionally substituted benzyl group, a naphthylmethyl group, an optionally substituted diphenylmethyl group or an optionally substituted alkyl group, $R^8$ is a hydrogen atom, $R^9$ is a hydrogen atom or a phenyl group, n is an integer of 1 to 4, m is 0, and the rest of $R^1$ to $R^4$ is a phenyl group, an optionally substituted benzyl group, a naphthylmethyl group, an optionally substituted diphenylmethyl group or an optionally substituted alkyl group.

Here, the substituent of the optionally substituted benzyl for $R^1$ to $R^4$ includes, for example, a halogen atom such as fluorine, chlorine, bromine, etc., cyano group, benzoyl group, alkyl group, a halogenated alkyl group such as trifluoromethyl, an optionally substituted phenyl group (said substituent includes, for example, a halogen atom such as fluorine, chlorine etc., a halogenated alkyl group such as trifluoromethyl, etc.) and the like. The number of the substituent is preferably 1 or 2.

Examples of the substituent of the optionally substituted diphenylmethyl group for $R^1$ to $R^4$ include a halogen atom such as fluorine, chlorine, etc.

The substituted alkyl group of the optionally substituted alkyl group for $R^1$ to $R^4$ includes, for example, a group represented by the formula: —$(CH_2)_p$—$PPh_2$ (wherein, p is an integer of 1 to 4).

In addition, specific examples of the optionally substituted benzyl group, optionally substituted diphenylmethyl group and optionally substituted alkyl group for $R^5$ to $R^7$ include those similar to the above-exemplified for $R^1$ to $R^4$, respectively.

(b) A phosphonium compound wherein, in the above formula (I), $R^2$ is a group represented by the above-mentioned formula (II), $R^6$, $R^7$ and $R^9$ are a phenyl group, $R^8$ is a hydrogen atom, m is 0, n is 2, $R^1$ and $R^5$ are combined together to form a $C_{1-4}$ alkylene group, and $R^3$ and $R^4$ are a phenyl group; specifically a phosphonium compound represented by the following formula (III):

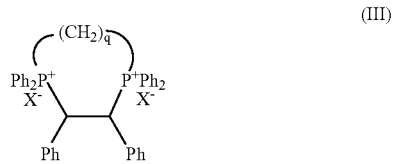

wherein, q is an integer of 1 to 4, X is as defined in the above formula (II).

(c) A phosphonium compound wherein, in the above formula (I), $R^1$ is a group represented by the formula (II), $R^5$ to $R^7$ are a phenyl group or a group represented by the formula: —$(CH_2)_p$—$PPh_2$ (wherein, p is an integer of 1 to 4), $R^8$ to $R^{11}$ are a hydrogen atom, A is an optionally substituted benzene ring, m and n are 1, and $R^2$ to $R^4$ are a phenyl group or a group represented by the formula: —$(CH_2)_p$—$PPh_2$ (wherein, p is an integer of 1 to 4); specifically a phosphonium compound represented by the following formula (IV):

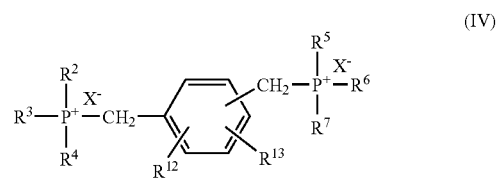

wherein, $R^{12}$ and $R^{13}$ are the same or different, and an alkyl group, an alkoxy group, a halogen atom, a nitro group, or a hydroxyl group, and $R^2$ to $R^4$, $R^5$ to $R^7$ and X are as defined in the formula (I) and formula (II). Moreover, the substitution position of substituent: —$CH_2$—$P^+R^5R^6R^7X^-$ may be any of o, m and p position.

(d) A phosphonium compound wherein, in the above formula (I), $R^2$ is a group represented by the above formula (II), $R^6$ and $R^7$ are a phenyl group, $R^8$ to $R^{11}$ are a hydrogen atom, A is an optionally substituted benzene ring, m and n are 1, $R^1$ and $R^5$ are combined together to form a $C_{1-8}$ alkylene group, and $R^3$ and $R^4$ are a phenyl group; specifically a phosphonium compound represented by the following formula (V):

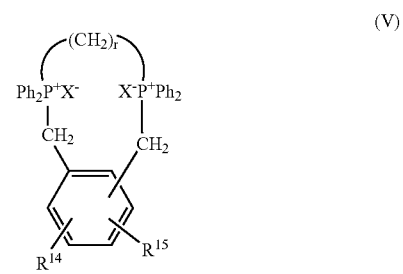

wherein, $R^{14}$ and $R^{15}$ are the same or different, and an alkyl group, an alkoxy group, a halogen atom, a nitro group or a hydroxyl group, and when the methylene groups on the benzene ring which phosphorous atoms are bound to are mutually at o-position, r is an integer of 1 to 4, and when said methylene groups are mutually at m position or p position, r represents an integer of 4 to 8, and X is as defined in the formula (II).

Among the above-mentioned phosphonium compound, that whose counter ion $X^-$ is $BPh_4^-$, $BF_4^-$, or a halogen ion is preferred. For example, when acid anhydride is used as a hardening agent of epoxy resin composition, the hardening reaction can be promoted at around 100° C. by adding the phosphonium halide of this invention, and furthermore in thin layer hardening by acid anhydride hardening agent, the epoxy resin composition can be hardened even at a low temperature of about 90° C. without lowering mechanical characteristics etc. by adding phosphonium halide of this invention.

Moreover, one kind of these phosphonium compounds may be used alone, or two or more kinds of them may be used together. Furthermore, unless the translucency, heat resistance, light fastness, etc. of the hardened resin are spoiled, other hardening accelerators can be also used together.

As the amount of hardening accelerator to be compounded, the phosphonium compound is 0.05 to 5 parts by weight (phr), preferably 0.1 to 3 parts by weight (phr) relative to 100 parts by weight (phr) of epoxy resin. When the amount of catalyst to be compounded is less than 0.05 parts by weight (phr), sufficient promotion effect of hardening reaction can't be obtained. In addition, when the amount of catalyst to be compounded is more than 5 parts by weight (phr), the more favorable improvement in promotion effect of polymerization reaction is not observed, and moreover it is unfavorable not only on the economic aspect but also from the reason that the moisture resistance of the hardened resin obtained is lowered and discoloration takes place.

The phosphonium compound represented by the formula (I) in the present invention can be produced by a method known per se, for example, by reacting organic tertiary phosphine compound and organic halide such as benzyl halide etc. to prepare organic phosphonium halide, followed by carrying out salt exchange.

Such preparation of organic phosphonium halide can be carried out in an organic solvent. As an organic solvent, for example, methanol, acetone, acetonitrile, N,N-dimethylacetamide etc. can be used.

Moreover, the reaction temperature is room temperature to 110° C., preferably about 30 to 80° C. The above-mentioned phosphonium halide of the present invention can be obtained by concentrating the reaction solution after the reaction, followed by purifying with a conventional method such as recrystallization.

Furthermore, the target phosphonium salt can be produced by subjecting the counter ion of obtained phosphonium halide to salt exchange by a conventional method, for example, using $KSbF_6$, $NaSbF_6$, etc.

Such a counter ion exchange reaction can be carried out in aqueous solvent such as water, water-methanol, water-acetone, water-acetonitrile and the like.

The epoxy resin used in the present invention is not particularly limited, and any of a monomer, oligomer or polymer can be used as long as it has one or more epoxy groups in the molecule and has transparency. As the epoxy resin, for example, a well-known aliphatic epoxy resin, alicyclic epoxy resin and aromatic epoxy resin are exemplified.

Examples of aliphatic epoxy resin include alkylene oxides obtained by epoxidation of aliphatic olefin, monoglycidyl ethers obtained by the reaction of aliphatic alcohol and epichlorohydrin etc., polyglycidyl ethers obtained by the reaction of polyalcohols such as glycerine, polyethylene glycol etc. and epichlorohydrin etc., glycidyl esters of aliphatic unsaturated carboxylic acid, and the like. Specifically, the compounds having one epoxy group in the molecule include, for example, propylene oxide, epoxybutane, epoxyhexane, epoxyoctane, butadiene monooxide, epoxyhexene, epoxyoctene, glycidyl methyl ether, glycidyl isopropyl ether, glycidyl butyl ether, glycidyl acrylate, glycidyl methacrylate, monoglycidyl ether of aliphatic higher alcohol, and the like. Oxirane compounds having 2 or more epoxy groups in the molecule include, for example, diepoxybutane, diepoxyoctane, diglycidyl ethers of ethylene glycol, 1,4-butanediol, 1,6-hexanediol, tetraethylene glycol, etc., di- or tri-glycidyl ethers of glycerine or its alkylene oxide adduct, tri-glycidyl ethers of trimethylol propane, di- or poly-glycidyl ethers of polyalkylene glycol such as polyethylene glycol and polypropylene glycol or alkylene oxide adduct thereof.

Examples of alicyclic epoxy resins include a compound containing cyclohexene oxide or cyclopentene oxide which is obtained by carrying out epoxidation of the compound having at least one cycloalkene ring such as cyclohexene or cyclopentene ring with suitable oxidizing agent such as hydrogen peroxide, peracid, etc.

Specifically as a compound having one oxirane ring in the molecule, for example, 3,4-epoxycyclohexylethylene and 3,4-epoxycyclohexylmethyl methacrylate are exemplified, and examples of alicyclic oxirane compounds having 2 epoxy groups in the molecule include 3,4-epoxycyclohexylmethyl-3',4'-epoxycyclohexanecarboxylate and a compound disclosed in JP-A 11-302372, and the like.

Examples of aromatic epoxy resin include, for example, monoglycidyl ethers obtained by reacting phenol, cresol or the like with epichlorohydrin; aromatic oxirane compounds having one epoxy group in the molecule such as an epoxypropylbenzene, styrene oxide, etc.; poly-glycidyl ethers produced by the reaction of bisphenols, polyphenols such as catechol, resorcinol etc., or alkylene oxide adduct thereof, or hydroxycarboxylic acids such as hydroxybenzoic acid, and hydroxynaphthoic acid etc. with epichlorohydrin; aromatic oxirane compounds having two or more epoxy groups in the molecule such as polyglycidyl esters obtained by reacting polycarboxylic acids such as phthalic acid, terephthalic acid, etc. with epichlorohydrin. Furthermore, epoxidated phenol novolak resins, epoxidated cresol novolak resins, hydrogenated bisphenol epoxy resins, and the like are exemplified.

Among the above-mentioned epoxy resins, epoxy resins having an unsaturated bond sometimes become the source of yellowing coloration and deterioration since the double bond is broken or oxidized by light of a short-wavelength or heat. Therefore, epoxy resins having no highly reactive unsaturated bond are preferred, and particularly aliphatic epoxy resins, above all, alicyclic epoxy resins are preferred. Specifically, such epoxy resins include, for example, 3,4-epoxycyclohexylmethyl-3',4'-epoxycyclohexanecarboxylate and 1,3,5-triglycidylisocyanurate which is a triazine derivative epoxy resin.

Moreover, one kind of these epoxy resins may be used alone, or two or more kinds of them may be used together. When an epoxy resin having unsaturated bond such as aromatic epoxy resin is used, it is desirable from a viewpoint of light fastness of hardened resins to lower the compounding ratio of epoxy resin having unsaturated bond by using epoxy resin having no unsaturated bond together.

The hardening agents of acid anhydride used in the present invention include, from the point of requirement of light fastness, compounds which are non-aromatic and have no carbon double bond chemically, for example, hexahydrophthalic anhydride, methylhexahydrophthalic anhydride, trialkyltetrahydrophthalic anhydride, hydrogenated methylnadic anhydride, and the like. One kind of these acid anhydride hardening agents may be used alone, or two or more kinds of them may be used together.

As the amount of acid anhydride hardening agent to be compounded, acid anhydride is 0.5 to 2.0 equivalents, preferably 0.7 to 1.5 equivalents relative to 1 equivalent of epoxy resin. In 0.5 equivalent or less, poor hardening arises and reliability falls. Moreover, in 2.0 equivalents or more, an unreacted hardening agent remains into the hardened resins, and the moisture resistance of hardened resins obtained is deteriorated.

The epoxy resin composition of the present invention may contain alcoholic polyols as a co-catalyst. Alcoholic polyols give flexibility to the hardened resins and not only improve exfoliation adhesive property, but also function as a mutual solubilizer of hardening accelerator. Since light fastness is required to alcoholic polyols, any of straight, branched, alicyclic or ether group-contained $C_{2-12}$ alcoholic polyols which are non-aromatic and have no carbon double bond chemical structurally are used suitably. Specifically, propanol, isopropanol, methylcyclohexanol, ethylene glycol, glycerol, trimethylolpropane, ethylene glycol monomethyl ether, etc. are exemplified.

Although the amount of alcoholic polyols to be compounded depends on the chemical structure and compounding amount of hardening accelerator since alcoholic polyols are also mutual solubilizer of hardening accelerator, low-molecular weight diols such as ethylene glycol, etc. are preferably a small amount of 1 to 30 parts by weight (phr), more preferably 5 to 20 parts by weight (phr) relative to 100 parts by weight (phr) of epoxy resin.

Within the scope which does not impair the hardening reaction of this invention, to the epoxy resin composition of the present invention can be added and mixed before use various known additives, for example, such as an inorganic filler, a reinforcing material, a colorant, stabilizers (a thermostabilizer, weatherproof improvement material, etc.), an extender, a viscosity modifier, a flame retarder, a ultraviolet absorber, an antioxidant, anti-discoloration agent, antibacterial agent, a fungicide, an age resister, an antistatic agent, a plasticizer, lubricant, a foaming agent, a release agent, etc. Examples of the above-mentioned colorant include dyes such as direct color, acid dye, basic dye, metal complex dye, etc.; inorganic pigments such as carbon black, titanium oxide, zinc oxide, iron oxide, mica, etc.; and organic pigments such as coupling azo, condensing azo, anthraquinone, thioindigo, dioxazoline, and phthalocyanine, etc. In addition, examples of the above-mentioned stabilizers include compounds such as hindered phenol, hydrazine, phosphorus, benzophenone, benzotriazol, oxalic acid anilide. Furthermore, examples of the above-mentioned inorganic filler include glass fiber, asbestos fiber, carbon fiber, silica fiber, alumina fiber, silica alumina fiber, zirconia fiber, boron nitride fiber, silicon nitride fiber, basic magnesium sulfate fiber, boron fiber, stainless steel fiber, inorganic and metal fibers such as aluminium, titanium, copper, brass, and magnesium, metal powders such as copper, iron, nickel, zinc, tin, lead, stainless steel, aluminium, gold, silver, etc., wood flour, oxide such as magnesia, and calcia, aluminum silicate, diatom earth, quartz powder, talc, clay, hydroxide of various metals, carbonate, sulfate, phosphate, borate, borosilicate, an aluminosilicate, titanate, basic sulfate, basic carbonate, and other basic salts, glass materials such as glass hollow ball, glass flakes, etc., ceramics such as silicon carbide, aluminum nitride, mullite, cordierite, etc., wastes of fly ash, micro silica, and inorganic fluorescent substances such as YAG:Ce phosphors which is a fluorescent substance capable of emitting yellow light by absorbing a part of blue light, and organic fluorescent substances and the like.

The epoxy resin composition of the present invention can be produced, for example, by compounding an epoxy resin, a hardening agent and a hardening accelerator to have the above-mentioned ratio, adding co-catalyst and other additives if necessary, and mixing uniformly under room temperature or warming according to a conventional method.

The epoxy resin composition of the present invention can be hardened promptly by heating at a wide range of temperature by choosing the kind of hardening accelerator. When heating temperature exceeds 200° C., it will come to have a bad effect on the quality of hardened resins, therefore heating temperature in the hardening reaction of the present invention is in the range of 80 to 200° C., preferably 100 to 180° C.

Although the reaction time, that is, heating time in the hardening reaction of epoxy resin composition of the present invention varies depending on the condition of hardening reaction such as feeding amount of epoxy resin, kind and amount of hardening accelerator, heating temperature, and the like, it is usually 1 minute to 24 hours, preferably 5 minutes to 10 hours, and more preferably 10 minutes to 5 hours.

Moreover, in the hardening reaction of epoxy resin composition of the present invention, it is desirable to carry out the reaction under inert gas atmosphere such as nitrogen gas, argon gas and helium gas in order to prevent degradation by undesirable oxidization of hardened resin obtained.

EXAMPLES

The present invention will be further illustrated by the following Examples and Comparison Examples. In addition, the hardening accelerator used in Example 1 and 2; 1,4-bis(benzyldiphenylphosphonia)butane ditetraphenylborate was synthesized by reacting phosphonium chloride which was obtained by the reaction of 1,4-bis(diphenylphosphino)butane and benzyl chloride with sodium tetraphenylborate, followed by subjecting to salt exchange. Its melting point was 180 to 183° C. Moreover, the catalyst used in Polymerization Examples 1 to 10 was synthesized similarly.

Example 1

100 Parts by weight (phr) of methylhexahydrophthalic anhydride(RIKACID MH700, manufactured by New Japan Chemical Co., Ltd.) was mixed with 2 parts by weight (phr) of ethylene glycol and 0.5 parts by weight (phr) of 1,4-bis(benzyldiphenylphosphonia)butane ditetraphenylborate salt to prepare a hardening agent solution. Then, 100 parts by weight (phr) of 3,4-epoxycyclohexylmethyl-3',4'-epoxycyclohexanecarboxylate which is an alicyclic epoxy resin (Celloxide 2021p, manufactured by Daicel Chemical Industries, Ltd.) was mixed with 125.19 parts by weight (phr) of above hardening agent solution (alicyclic epoxy resin:hardening agent=1:1 by epoxy equivalent ratio) at room temperature to prepare an epoxy resin composition solution. YAG phosphors (($Y_{0.8}Gd_{0.2}$)$_{2.965}Al_5O_{12}$:$Ce_{0.035}$) in which Y is replaced by Gd at a ratio of about 20% and median diameter of the particle size distribution of the fluorescent material is 21.429 μm) and the above-mentioned epoxy resin composition solution was mixed to have a weight ratio of 45:100 so that the light of X,Y=(0.33, 0.33) could be obtained in the chromaticity coordinate of CIE, and dispersed uniformly with a ball mill for 24 hours. The dispersion liquid was potted with a syringe into the cup in which LED chip had been set up, and hardened with heating in an oven preheated at 170° C. for 2 hours to prepare LED.

The resulting LEDs were stored under the condition of 85° C. and 85% RH for 0, 24 and 48 hours, respectively. Each of the LEDs was passed through solder reflow, and the change of emission color was examined before and after reflow (refer to FIG. 1).

In addition, the glass transition temperature Tg of the 30 mm×30 mm×3 mm hardened resin plate which was prepared using the above-mentioned epoxy resin composition solution (provided that YAG phosphors was not contained) by a similar method was 184° C.

Comparison Example 1

100 Parts by weight (phr) of methylhexahydrophthalic anhydride was mixed with 2 parts by weight (phr) of ethylene glycol and 0.5 parts by weight (phr) of benzyltriphenylphosphonium bromide salt to prepare a hardening agent solution. Then, 100 parts by weight (phr) of 3,4-epoxycyclohexylmethyl-3',4'-epoxycyclohexanecarboxylate which is an alicyclic epoxy resin was mixed with 125.19 parts by weight (phr) of above hardening agent solution (alicyclic epoxy resin:hardening agent=1:1 by epoxy equivalent ratio) at room temperature to prepare an epoxy resin composition solution. YAG phosphors and the above-mentioned epoxy resin composition solution was mixed to have a weight ratio of 45:100 so that the light of X,Y=(0.33, 0.33) could be obtained in the chromaticity coordinate of CIE, and dispersed uniformly with a ball mill for 24 hours. The dispersion liquid was potted with a syringe into the cup in which LED chip had been set up, and hardened with heating in an oven preheated at 170° C. for 2 hours to prepare LED.

The resulting LEDs were stored under the condition of 85° C. and 85% RH for 0, 24 and 48 hours, respectively. Each of the LEDs was passed through solder reflow, and the change of emission color was examined before and after reflow (refer to FIG. 2).

In addition, the glass transition temperature Tg of the 30 mm×30 mm×3 mm hardened resin plate which was prepared using the above-mentioned epoxy resin composition solution (provided that YAG phosphors was not contained) by a similar method was 189° C.

Figure 2:
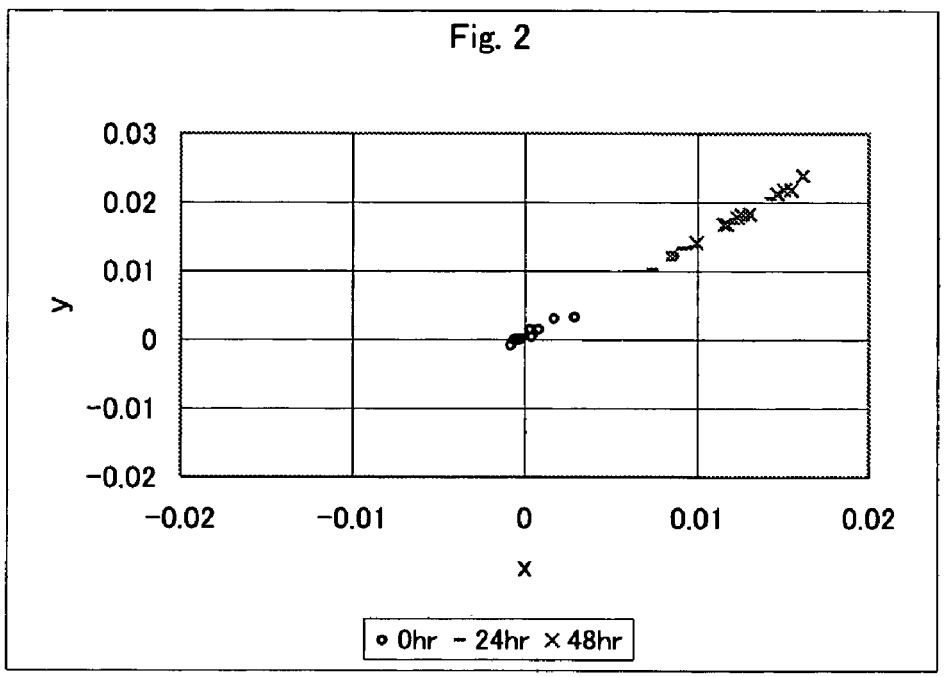
FIG. 2 is a chromaticity diagram showing the change of emission color of the epoxy resin hardened resin (LED) obtained in Comparison Example 1.

Although the color change after moisture absorption has taken place from the chromaticity diagram of FIGS. 1 and 2 by both LED wherein the conventional hardening accelerator was used (Comparison Example 1) and LED wherein the hardening accelerator represented by the general formula (I) was used (Example 1), it turns out that when the hardening accelerator represented by the general formula (I) is used, color change of the hardened resin is smaller and the heat resisting property of the hardened resin is improved.

Example 2

100 Parts by weight (phr) of methylhexahydrophthalic anhydride was mixed with 2 parts by weight (phr) of ethylene glycol and 0.5 parts by weight (phr) of 1,4-bis(benzyldiphenylphosphonia)butane ditetraphenylborate salt to prepare a hardening agent solution. Then, 100 parts by weight (phr) of 1,3,5-triglycidylisocyanurate which is a triazine derivative epoxy resin having a melting point of 100° C. was mixed with 328.32 parts by weight (phr) of above hardening agent solution (triazine derivative epoxy resin:hardening agent=1:2 by epoxy equivalent ratio) at room temperature to prepare an epoxy resin composition solution. YAG phosphors and the above-mentioned epoxy resin composition solution was mixed to have a weight ratio of 45:100 so that the light of X,Y=(0.33, 0.33) could be obtained in the chromaticity coordinate of CIE, and dispersed uniformly with a ball mill for 24 hours. The dispersion liquid was potted with a syringe into the cup in which LED chip had been set up, and hardened with heating in an oven preheated at 170° C. for 2 hours to prepare LED.

The resulting LEDs were stored under the condition of 85° C. and 85% RH for 0, 24 and 48 hours, respectively. Each of the LEDs was passed through solder reflow, and the change of emission color was examined before and after reflow (refer to FIG. 3).

In addition, the glass transition temperature Tg of the 30 mm×30 mm×3 mm hardened resin plate which was prepared using the above-mentioned epoxy resin composition solution (provided that YAG phosphors was not contained) by a similar method was 183° C.

Comparison Example 2

100 Parts by weight (phr) of methylhexahydrophthalic anhydride was mixed with 2 parts by weight (phr) of ethylene glycol and 0.5 parts by weight (phr) of benzyltriphenylphosphonium bromide salt to prepare a hardening agent solution. Then, 100 parts by weight (phr) of 1,3,5-triglycidylisocyanurate which is a triazine derivative epoxy resin having a melting point of 100° C. was mixed with 328.32 parts by weight (phr) of above hardening agent solution (triazine derivative epoxy resin:hardening agent=1:2 by epoxy equivalent ratio) at room temperature to prepare an epoxy resin composition solution. YAG phosphors and the above-mentioned epoxy resin composition solution was mixed to have a weight ratio of 45:100 so that the light of X,Y=(0.33, 0.33) could be obtained in the chromaticity coordinate of CIE, and dispersed uniformly with a ball mill for 24 hours. The dispersion liquid was potted with a syringe into the cup in which LED chip had been set up, and hardened with heating in an oven preheated at 170° C. for 2 hours to prepare LED.

The resulting LEDs were stored under the condition of 85° C. and 85% RH for 0, 24 and 48 hours, respectively. Each of the LEDs was passed through solder reflow, and the change of emission color was examined before and after reflow (refer to FIG. 4).

In addition, the glass transition temperature Tg of the 30 mm×30 mm×3 mm hardened resin plate which was prepared using the above-mentioned epoxy resin composition solution (provided that YAG phosphors was not contained) by a similar method was 191° C.

Comparison Example 3

100 Parts by weight (phr) of methylhexahydrophthalic anhydride was mixed with 2 parts by weight (phr) of ethylene glycol and 0.5 parts by weight (phr) of tetrabutylphosphonium tetraphenylborate salt to prepare a hardening agent solution. Then, 100 parts by weight (phr) of 1,3,5-triglycidylisocyanurate which is a triazine derivative epoxy resin having a melting point of 100° C. was mixed with 328.32 parts by weight (phr) of above hardening agent solution (triazine derivative epoxy resin:hardening agent=1:2 by epoxy equivalent ratio) at room temperature to prepare an epoxy resin composition solution. YAG phosphors and the above-mentioned epoxy resin composition solution was mixed to have a weight ratio of 45:100 so that the light of X,Y=(0.33, 0.33) could be obtained in the chromaticity coordinate of CIE, and dispersed uniformly with a ball mill for 24 hours. The dispersion liquid was potted with a syringe into the cup in which LED chip had been set up, and hardened with heating in an oven preheated at 170° C. for 2 hours to prepare LED.

Figure 5:
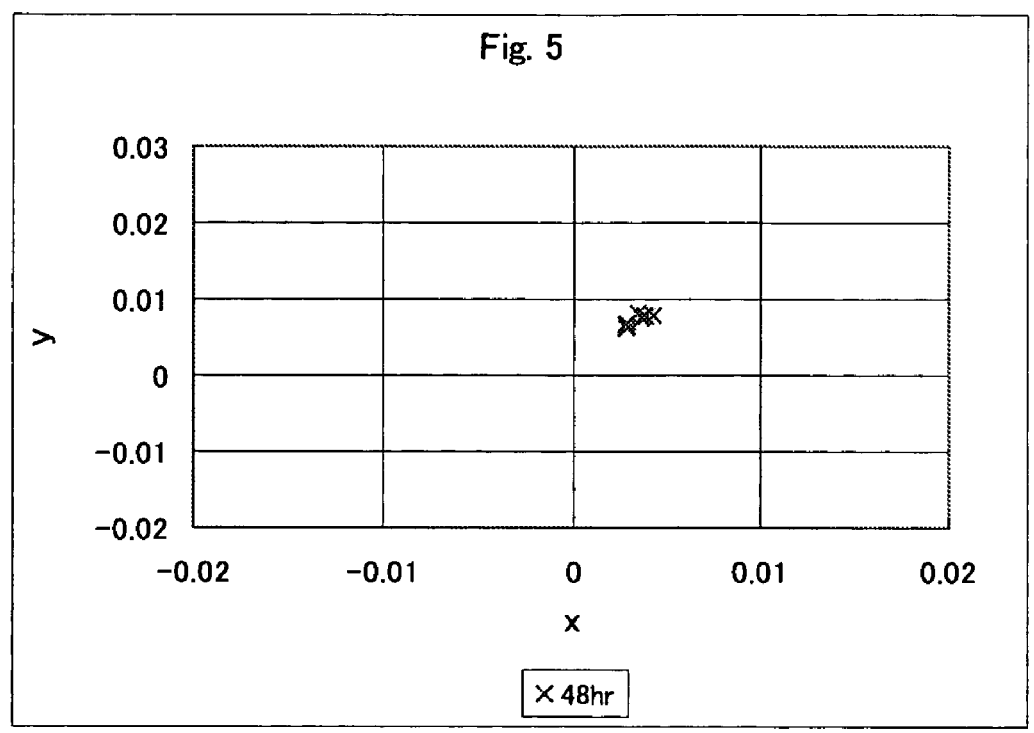
FIG. 5 is a chromaticity diagram showing the change of emission color of the epoxy resin hardened resin (LED) obtained in Comparison Example 3.

The resulting LED which was stored under the condition of 85° C. and 85% RH for 48 hours was passed through solder reflow, and the change of emission color was examined before and after reflow (refer to FIG. 5).

In addition, the glass transition temperature Tg of the 30 mm×30 mm×3 mm hardened resin plate which was prepared using the above-mentioned epoxy resin composition solution (provided that YAG phosphors was not contained) by a similar method was 180° C.

Figure 3:
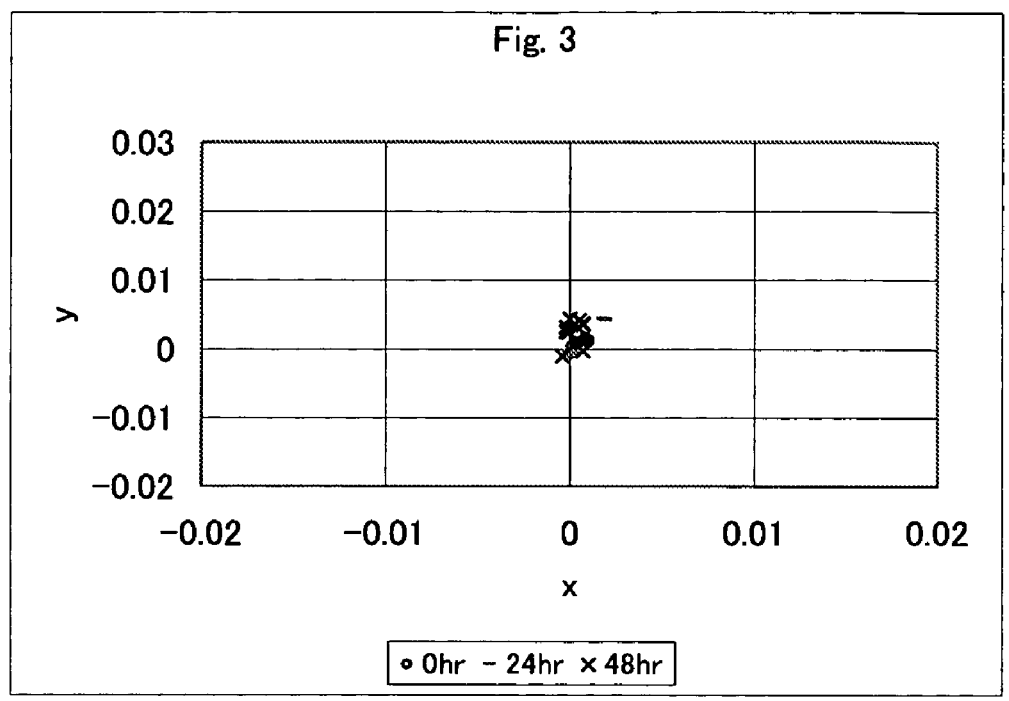
FIG. 3 is a chromaticity diagram showing the change of emission color of the epoxy resin hardened resin (LED) obtained in Example 2.
Figure 4:
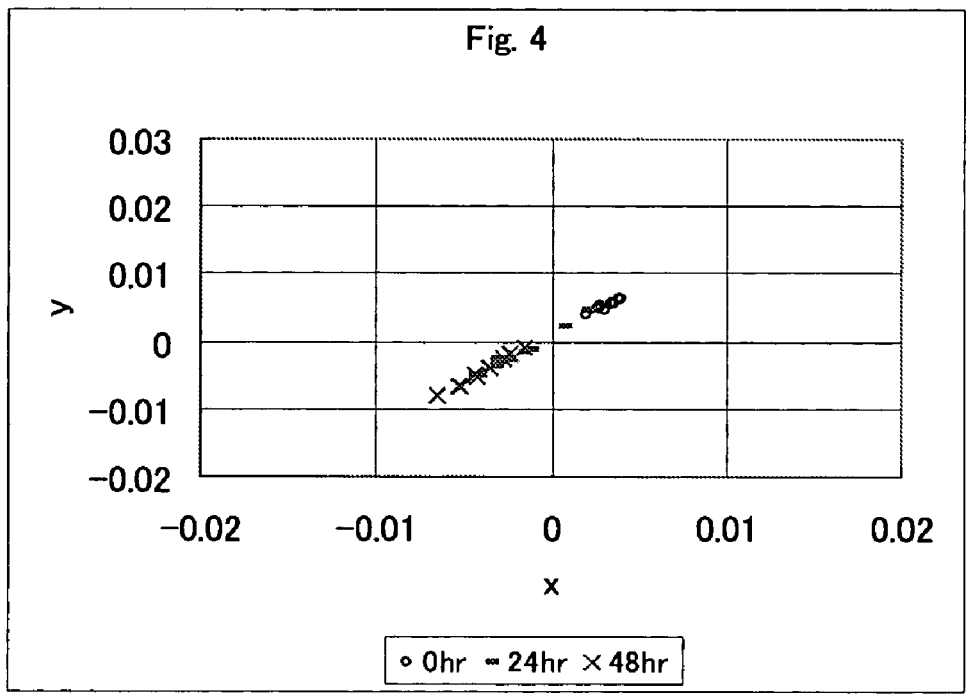
FIG. 4 is a chromaticity diagram showing the change of emission color of the epoxy resin hardened resin (LED) obtained in Comparison Example 2.

It can be understood from the chromaticity diagram of FIGS. 3, 4, and 5 that the color change after moisture absorption is large in the LED wherein conventional hardening accelerator (bromine salt) was used (Comparison Example 2). Although the color change was small in the LED wherein conventional hardening accelerator (boric acid salt) was used (Comparison Example 3) and LED wherein the hardening accelerator represented by the general formula (I) was used (Example 2), it turned out that among them, when the hardening accelerator represented by the general formula (I) is used, color change of the hardened resin is smaller and the heat resisting property of the hardened resin is improved.

Polymerization Examples 1–10

The epoxy resin composition consisting of Celloxide 2021p/RIKACID MH700/ethylene glycol/catalyst=100/100/2/1 by weight ratio was put into the board-like mold (60 mm×50 mm×3 mm), and hardened with heating under the conditions shown in Table 1 to give each hardened resin.

TABLE 1

| Polymerization Example | Catalyst | Polymerization Temperature | Reaction Time |
|---|---|---|---|
| 1 | bis[2-(trifluoromethyl)benzyl]diphenylphosphonium ethylene chloride salt | 100° C. | 2 hr |
| 2 | bis[2-fluorobenzyl]diphenylphosphonium ethylene chloride salt | 100° C. | 2 hr |
| 3 | bis[2-fluorobenzyl]diphenylphosphonium ethylene bromide salt | 100° C. | 2 hr |
| 4 | p-xylylenebis(triphenylphosphonium chloride) | 90° C. | 2 hr |
| 5 | p-xylylenebis(triphenylphosphonium tetraphenylborate) | 130° C. | 2 hr |
| 6 | o-xylylenebis(diphenylphosphonium chloride), cyclic | 100° C. | 2 hr |
| 7 | bis[(4-chlorobenzyl)diphenylphosphonium] tetramethylene dichloride | 90° C. | 2 hr |
| 8 | bis[(4-chlorobenzyl)diphenylphosphonium] tetramethylene bis(tetraphenylborate) | 130° C. | 2 hr |

TABLE 1-continued

| Polymerization Example | Catalyst | Polymerization Temperature | Reaction Time |
|---|---|---|---|
| 9 | 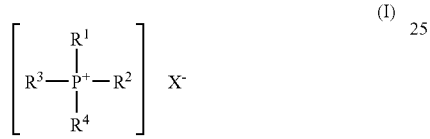 | 130° C. | 2 hr |
| 10 | 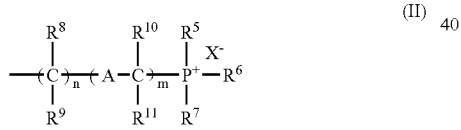 | 130° C. | 2 hr |

What is claimed is:

1. An epoxy resin composition comprising an epoxy resin, an acid anhydride hardening agent and a hardening accelerator as indispensable ingredients, wherein said hardening accelerator is a phosphonium compound represented by the following formula (I):

$$\left[ \begin{array}{c} R^1 \\ | \\ R^3-P^+-R^2 \\ | \\ R^4 \end{array} \right] X^- \quad (I)$$

wherein X represents a halogen atom, $SbF_6$, $AsF_6$, $PF_6$, $BF_4$ or $BPh_4$, and $R^1$ to $R^4$ are the same or different, and are an optionally substituted alkyl group, an optionally substituted aryl group, an optionally substituted aralkyl group, an optionally substituted diarylmethyl group or a group represented by the following formula (II):

$$-(\underset{\underset{R^9}{|}}{\overset{\overset{R^8}{|}}{C}})_n-A-(\underset{\underset{R^{11}}{|}}{\overset{\overset{R^{10}}{|}}{C}})_m-\underset{\underset{R^7}{|}}{\overset{\overset{R^5}{|}}{P^+}}-R^6 \quad X^- \quad (II)$$

wherein $R^5$ to $R^7$ are the same or different, and are an optionally substituted alkyl group, an optionally substituted aryl group, an optionally substituted aralkyl group or an optionally substituted diarylmethyl group, $R^8$ to $R^{11}$ are the same or different, and are a hydrogen atom, an optionally substituted alkyl group or an optionally substituted aryl group, A is an optionally substituted aromatic hydrocarbon ring, n is an integer of 1 to 5, m is 0 or 1, and X is as defined in the formula (I);

provided that at least one of $R^1$ to $R^4$ is a group represented by the formula (II), and when m is 1, any one of $R^1$ to $R^4$ and any one of $R^5$ to $R^7$ are combined together to form a lower alkylene group which forms a heterocyclic ring containing two phosphorus atoms.

2. The epoxy resin composition according to claim 1 wherein the phosphonium compound is one or more phosphonium compound selected from the group consisting of (a) a phosphonium compound wherein, in the above formula (I), at least one of $R^1$ to $R^4$ is a group represented by the formula (II), $R^5$ to $R^7$ are the same or different, and are a phenyl group, an optionally substituted benzyl group, a naphthylmethyl group, an optionally substituted diphenylmethyl group or an optionally substituted alkyl group, $R^8$ is a hydrogen atom, $R^9$ is a hydrogen atom or a phenyl group, n is an integer of 1 to 4, m is 0, and the rest of $R^1$ to $R^4$ is a phenyl group, an optionally substituted benzyl group, a naphthylmethyl group or an optionally substituted diphenylmethyl group or an optionally substituted alkyl group, (b) a phosphonium compound wherein, in the above formula (I), $R^2$ is a group represented by the formula (II), $R^6$, $R^7$ and $R^9$ are a phenyl group, $R^8$ is a hydrogen atom, m is 0, n is 2, $R^1$ and $R^5$ are combined together to form a $C_{1-4}$ alkylene group, and $R^3$ and $R^4$ are a phenyl group, and (c) a phosphonium compound wherein, in the above formula (I), $R^2$ is a group represented by the formula (II), $R^6$ and $R^7$ are a phenyl group, $R^8$ to $R^{11}$ are a hydrogen atom, A is an optionally substituted benzene ring, m and n are 1, $R^1$ and $R^5$ are combined together to form a $C_{1-8}$ alkylene group, and $R^3$ and $R^4$ are a phenyl group.

3. The epoxy resin composition according to claim 1, wherein the amount of the phosphonium compound is 0.05 to 5 parts by weight (phr) relative to 100 parts by weight (phr) of epoxy resin.

4. The epoxy resin composition according to claim 1, wherein the epoxy resin comprises a triazine derivative epoxy resin.

5. A hardened resin which is obtained by heating and curing the epoxy resin composition according to claim 1.

* * * * *